June 14, 1932.    R. Z. DRAKE    1,863,087
MEANS FOR HANDLING LUMBER
Filed April 10, 1929    3 Sheets-Sheet 1
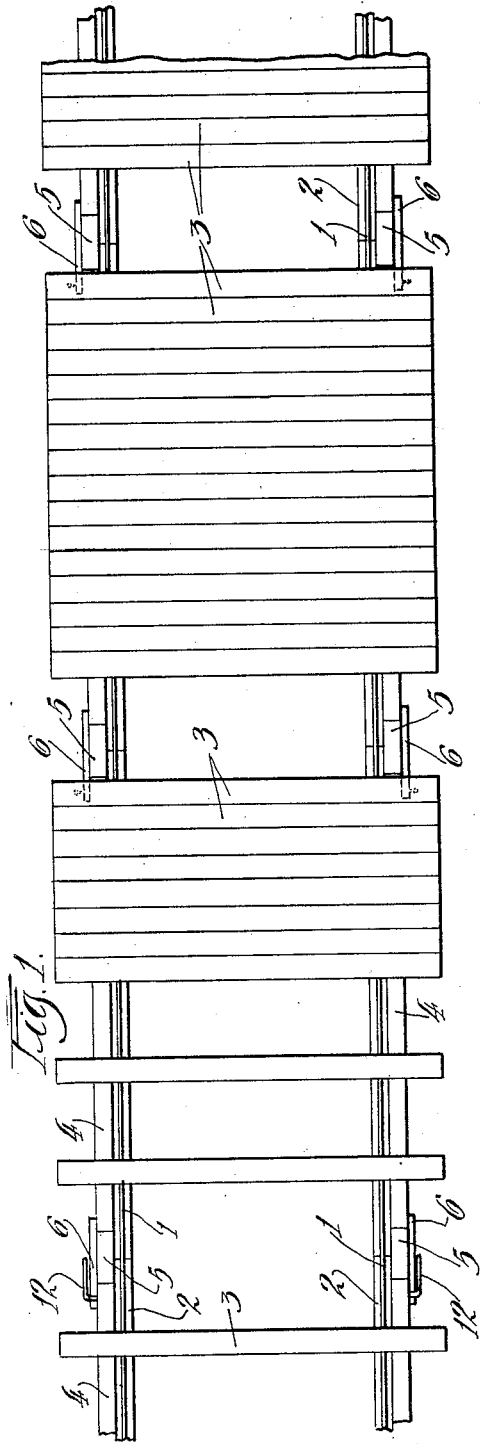
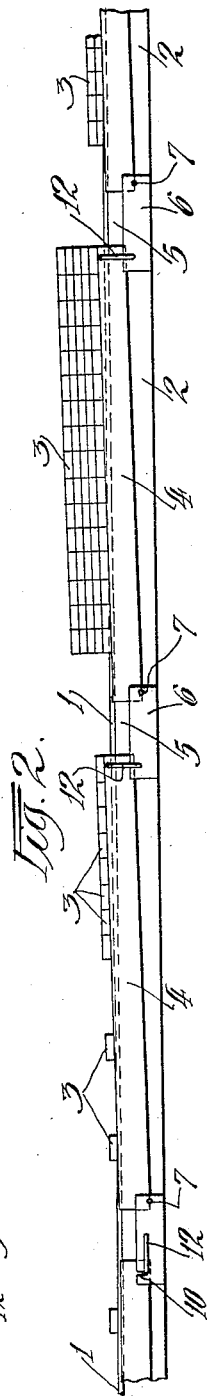
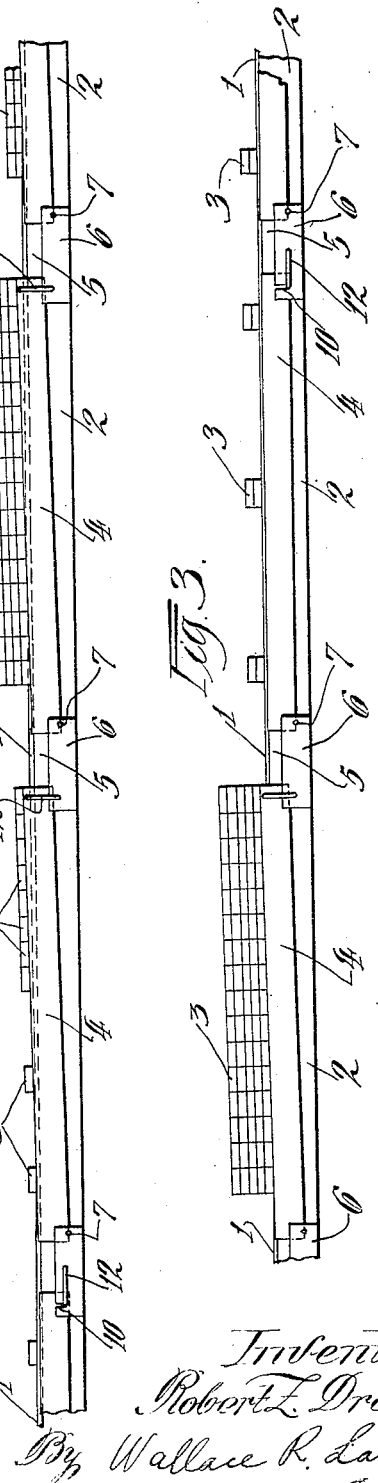
Inventor:
Robert Z. Drake,
By Wallace R. Lane
Attorney

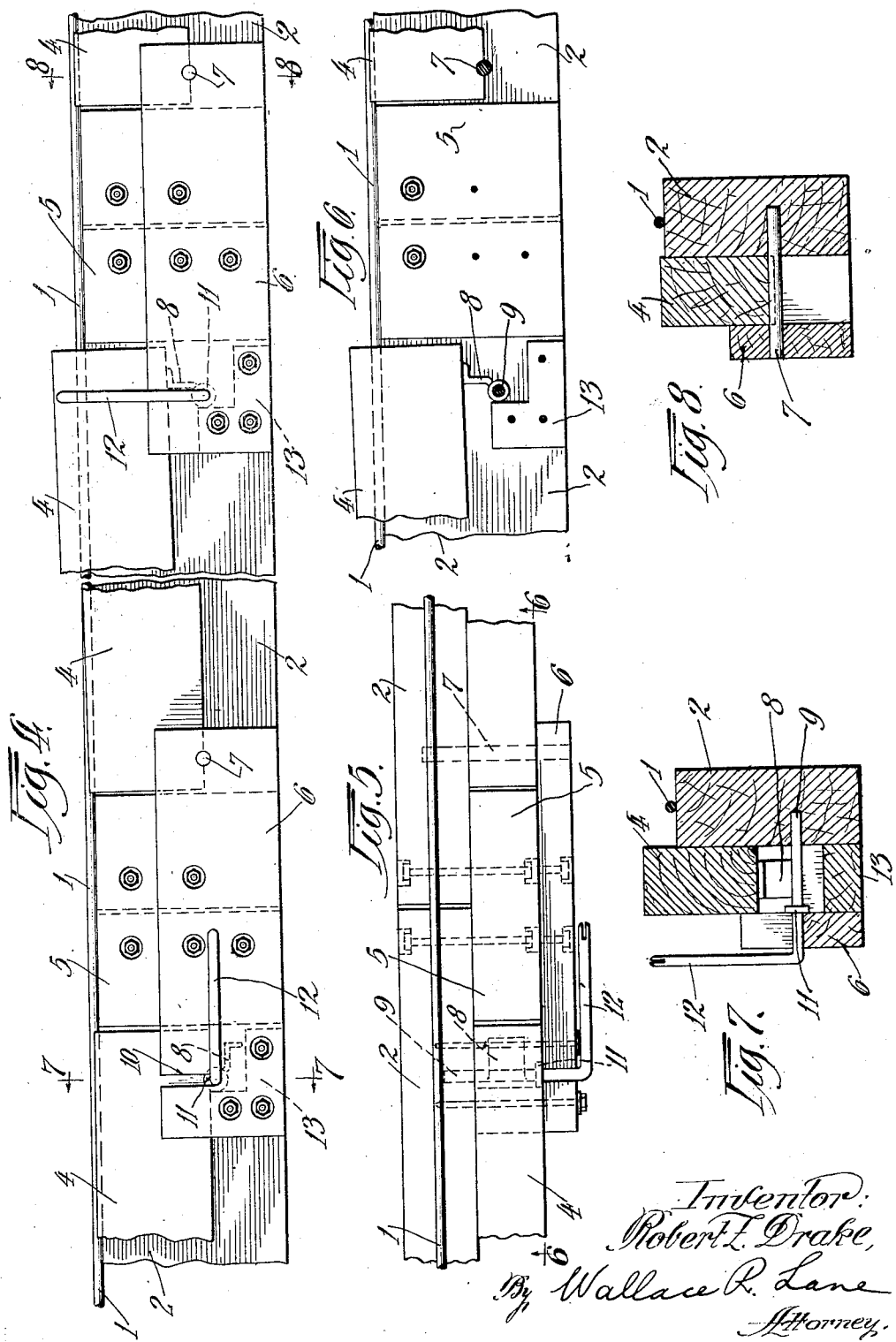

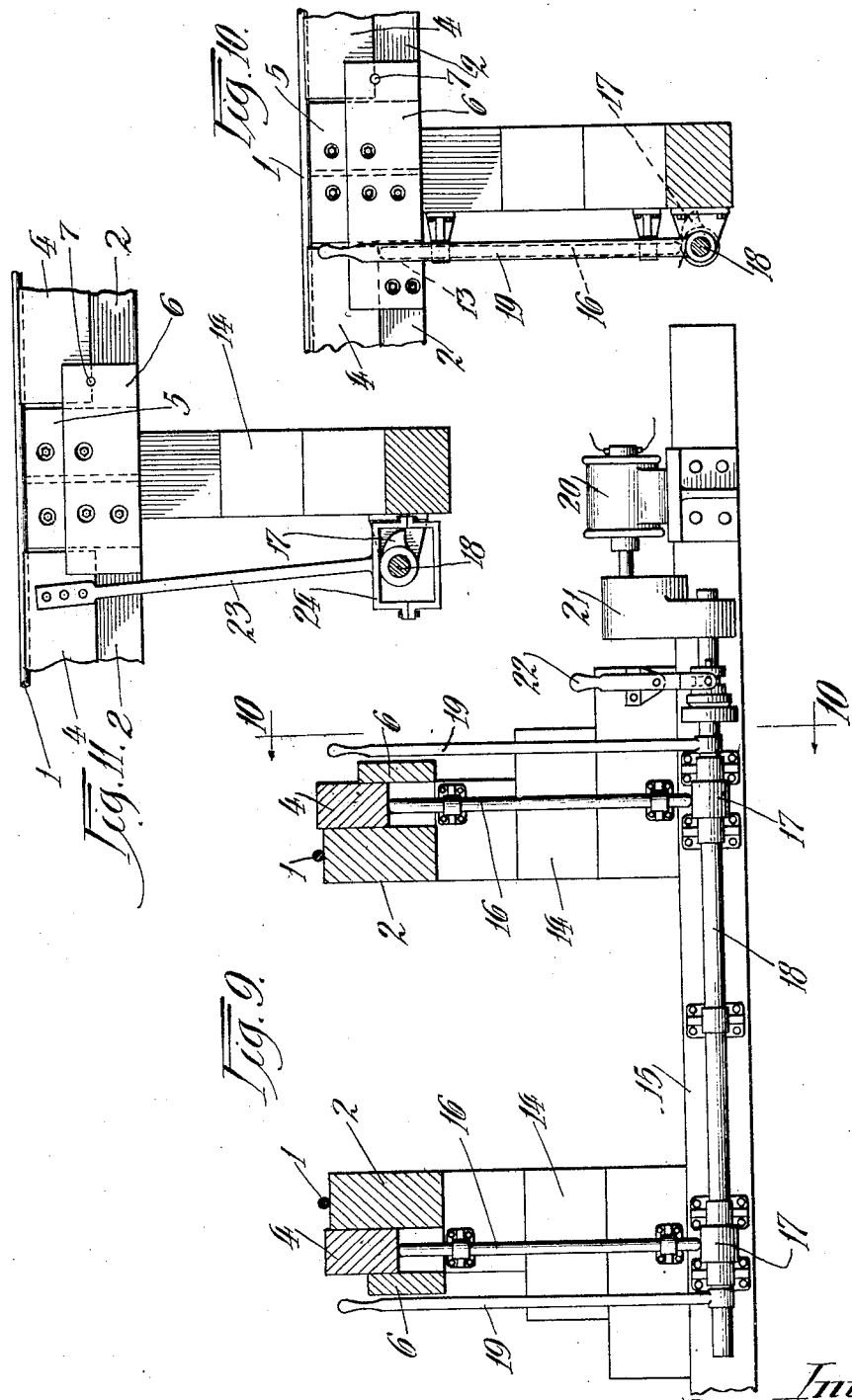

Patented June 14, 1932

1,863,087

UNITED STATES PATENT OFFICE

ROBERT Z. DRAKE, OF OMAHA, NEBRASKA

MEANS FOR HANDLING LUMBER

Application filed April 10, 1929. Serial No. 353,979.

This invention relates to a novel method for handling lumber that is being moved on a conveyor, and also the provision of apparatus for reducing this method to practice.

Among the objects of my invention is to provide an improved method of handling lumber and apparatus for carrying the method into practice, and is especially applicable to the handling of lumber being carried along a conveyor, and to render possible the storage of the lumber at desired places along the conveyor without stopping the movement of the conveyor.

A further object is to enable the lumber, or the like, being carried by a conveyor to be brought to a position of rest and out of contact with the conveyor and without stopping movement of the latter.

A still further object is to provide an improved lumber conveying means in which the lumber at any one or more places along the conveyor can be easily and quickly brought to rest without stopping the conveyor, and when desired can be readily and quickly caused to again move with the conveyor.

Another object is to produce a novel lumber storage skid capable of quickly and easily moving lumber out of contact with its conveying means, and when desired quickly returning it into contact with the conveyor.

A further object of my invention is to provide lumber conveying apparatus having means provided at a plurality of positions along its length for bodily lifting the lumber out of contact with the conveyor for any desired length of time.

A further object of this invention is to provide novel temporary storage means at a plurality of positions along the length of a lumber conveying apparatus.

A further object of the invention is to provide a lumber conveyor with a plurality of movable skids opposite one another in the transverse direction and adapted to be operated simultaneously at will by a single actuating means.

A still further object of the invention is to provide a lumber conveyor with a plurality of movable skids opposite one another in the transverse direction and adapted to be operated simultaneously at will by means of a manual operating means on a motor.

Further objects, advantages and capabilities will later more fully appear.

My invention further resides in the combination, construction and arrangement of parts illustrated in the accompanying drawings, and while I have shown therein a preferred embodiment of my invention I wish it understood that the same is susceptible of modification and change without departing from the spirit of my invention.

In the drawings—

Fig. 1 is a plan view of lumber conveying apparatus embodying my invention.

Fig. 2 is a side elevation of the apparatus shown in Fig. 1.

Fig. 3 is a side elevation of my lumber handling apparatus, but showing the parts in a different position of adjustment.

Fig. 4 is a fragmentary side elevation of a portion of the conveyor showing the mounting of the storage skids and means for lifting the same, parts being broken away in this view.

Fig. 5 is a fragmentary plan view of a portion of one side of the conveyor, showing in dotted lines the mechanism for lifting the storage skids, and also the manner of attaching certain of the parts together.

Fig. 6 is a sectional view along the line 6—6 of Fig. 5, but showing the storage skid elevating means in position for holding one end of the storage skid elevated.

Fig. 7 is a vertical transverse section through line 7—7 of Fig. 4.

Fig. 8 is a vertical transverse section through line 8—8 of Fig. 4.

Fig. 9 is a sectional elevation taken transversely of the conveyor showing a modified form of my invention in which a plurality of skids is operable at will by manually operated means or by a motor, Fig. 10 is a sectional view on the line 10—10 of Fig. 9, and Fig. 11 is a similar view of a modification.

In the particular embodiment of my invention illustrated in Figs. 1 to 8 of the drawings, there are provided a pair of parallel laterally spaced longitudinally extending endless cables, or the like, 1—1, which are given a continuous longitudinal movement by any suitable means such as a drum, or the like, driven by any desirable source of power. Cables 1 slide upon the upper surface of the transfer skids 2, which transfer skids are stationary and extend the full length of the conveyor.

With this arrangement it will be understood that pieces of lumber 3 may be laid crosswise of the two cables 1—1, as shown in Fig. 1, the pieces of lumber being thus carried along the conveyor to the point at which they are to be delivered. While the conveyor herein described may be employed in any desired location for the movement of lumber, I may mention that it is particularly adapted for use in connection with the seasoning house or other storage house of the type described in my Patent No. 1,588,949 issued June 15, 1926. As will readily be understood the conveyor is adapted to cooperate with a storage mechanism of the type described in the aforesaid patent, or any suitable unloading mechanism which is adapted to supply lumber to said conveyor. In the operation of conveyors of this type, it is frequently necessary or desirable to interrupt the passage of lumber at one or several points along the conveyor. Apparatus for attaining this result will now be described.

On the outer sides of the transfer skids 2, I mount storage skids 4, said storage skids being arranged in pairs, one member of a pair being located on the outer side of one of the transfer skids 2 and the other member on the outer side of the other transfer skid opposite the first member, so that the members of each pair of storage skids may be operated together for the purpose of stopping the passage of pieces of lumber past a particular point on the conveyor or the accumulation of such pieces of lumber at that particular point. While one or more pairs of storage skids 4, may be provided at various points along the conveyor, it is preferred to provide a practically continuous series of such skids along the conveyor.

Preferably the skids 4 are almost as long as the timbers constituting the transfer skids 2 and are located between the splice blocks 5 which are bolted to adjacent ends of such timbers as shown in Figs. 4 and 5. On the exterior of each splice block 5 is mounted, preferably by means of bolts extending through said splice block and the skids 2, a lash member 6, which is somewhat longer than the splice block 5 and has ends extending therebeyond for the purpose of carrying supporting means for the storage skids 4. At one end of the lash member 6 is provided a shaft 7 which extends through the lash member 6 and enters partly into the transfer skids 2. The shaft 7 serves as a pivot for the storage skids 4, which is provided near its end on its under side with a transverse cut of arcuate cross-section, adapted to cooperate with the circular surface of the shaft 7.

At the other end of the lash member 6, is located a cam member 8, by means of which the storage skid 4 is adapted to be raised when desired. The cam member 8 is mounted upon a horizontal shaft 9, which is rotatably mounted in the transfer skid 2 and on the bottom of a vertical slot 10 provided in the lash member 6. On the inside of the lash member 6 the horizontal shaft 9 is provided with a bearing collar 11, and on the outer side of said lash member it carries a handle 12 which extends in a radial direction. At this end of the lash member 6, is provided a bearing block 13 of L shape. This block is held in position between the lash member 6 and the transfer skid 2 by means of bolts and serves as a support for the movable end of the storage skid 4 when in its lower position, and as an abutment for the cam 8 when the latter is in inoperative position, thereby maintaining the handle 12 in horizontal position. It will be understood that each storage skid member 4 is provided at one end with a pivot member 7, and at the other end with a cam 8. The splice blocks 5 are somewhat thicker than the storage skids 4, so that the latter are able to move freely about their pivots 7.

When the storage skid members 4 are in inoperative position, their upper surface lies below the carrying surface of the cables 1 so that the pieces of lumber 3 pass on uninterruptedly along the conveyor. When, however, the handle 12 is rotated from the horizontal position, as shown on the left hand side of Fig. 4 to the vertical position as shown on the right hand side of Fig. 4, the cam member 8 is likewise rotated and elevates the movable end of the storage skid 4, so that the upper surface thereof is raised above the cable 1. The storage skid 4 is maintained by the cam member 8, in this elevated position until the lever 12 is rotated in the opposite direction and returned to the horizontal position.

The operation of the device is as follows:

When it is desired to interrupt the passage of pieces of lumber along the conveyor at any particular point thereon, the handles 12 associated with the movable ends of a pair of storage skids 4 are rotated from their horizontal to their vertical position. Any pieces of lumber which are located above said storage skids 4 are raised from the cables 1 so that they no longer travel therewith. The movement of the cables is not interfered with so that pieces of lumber at other points thereon are conveyed as before. Thus the conveyor may continue to deliver pieces of lumber to the raised storage skids 4 but such pieces of lumber are unable to pass said skids and accumulate thereat. Such pieces of lumber may be stored on the elevated skids 4 in any suitable manner. Thus as shown in Fig. 2 the pieces of lumber may be arranged in layers 1, 2, 5 or more deep and may be retained there for any desired time, whereafter they may be supplied to the conveyor by hand or by returning the handles 12 to their horizontal position, whereby the elevated skids 4 are permitted to descend and the load carried thereby returned to the conveyor. Since each pair of storage skids 4 is capable of independent operation, it is obvious that any one or any combination of pairs of storage skids may be operated simultaneously when desired.

Referring to Figs. 9 and 10, the timbers constituting the skids 2 are supported at their ends on timbers 14 which are supported on a cross-cap 15 forming part of the building.

Each skid 4 is engaged on its underside near its free end by vertical lifting rods 16, mounted in suitable bearings carried by the timbers 14.

The lower ends of said lifting rods 16 rest upon cams 17 rigidly mounted on a horizontal shaft 18, mounted in suitable bearings carried by the cross-cap 15.

At either side of the conveyor the shaft 18 carries a handle 19 and one end of said shaft is connected to a reversible electric motor 20, suitable gearing shown diagrammatically at 21, and a clutch 22 being interposed between said shaft 18 and the motor 20.

It will be readily understood that both the skids 4 may be raised simultaneously by manual operation of either of the handles 19 or by the motor 20. It will also be understood that the operation of the motor may be controlled by means of a switch located adjacent to the skids or at any suitable point remote therefrom. Further where a large number of pairs of skids 4 are employed along the conveyor, as is preferably the case, the motors associated therewith may be controlled from a central point, if desired.

As shown in Fig. 11, the sliding rods 16 may be replaced by rods 23 rigidly attached to the forward ends of said skids 4. At their lower ends the rods 23 are provided with straps 24 which surround the cam 17 and retain said rod in cooperative engagement therewith.

Having thus disclosed my invention, I claim:

1. In lumber handling apparatus a pair of continuously moving spaced parallel conveyor cables for carrying pieces of lumber laid cross-wise thereon, a plurality of longitudinally spaced pairs of storage skids, each pair consisting of skids pivotally mounted at one end outside of each cable and normally below and out of contact with the lumber moving with the cables, and manually operable for selectively elevating one end of one or more selected pairs of skids as desired, to raise the lumber thereover out of contact with the cables and hold it out of such contact and stationary as long as desired.

2. In lumber handling apparatus a pair of continuously moving spaced parallel conveyor cables for carrying pieces of lumber laid cross-wise thereon, a plurality of longitudinally spaced pairs of storage skids, each pair consisting of skids pivotally mounted at one end outside of each cable and normally below and out of contact with the lumber moving with the cables, and manually operable means for selectively elevating one end of one or more selected pairs of skids as desired, to raise the lumber thereover out of contact with the cables and hold it out of such contact and stationary as long as desired, said means being also manually operable to lower the lumber into contact with the cables at any time desired.

3. In lumber handling apparatus for stopping the movement of lumber on continuously moving conveyor cables, a pair of storage skids each pivoted near one end, a lifting cam adjacent the opposite end of each skid, and manually operable means for rotating said cams to swing one end of the skids upwardly to lift the lumber away from the cables and halt its progress as long as desired.

4. Lumber handling apparatus comprising a flexible conveyor for transporting lumber, storage skids movably mounted adjacent said conveyor, and means for moving said skids, said means comprising a rotatable cam, a rod operated by said cam and engaging said skid for movement thereof, and means for rotating said cam.

5. A lumber handling device comprising a conveyor for moving pieces of lumber, movable members normally below said conveyor, cam means provided with cam surfaces, and means controlled by said cam surfaces for raising and lowering said members for arresting movement of said pieces of lumber.

6. A lumber handling device comprising a conveyor for moving a plurality of pieces of lumber, movable means normally below said conveyor, and cam means for raising said movable means and for elevating and arresting movement of said pieces of lumber.

7. A lumber handling device comprising a conveyor for moving a plurality of pieces of lumber, movable means normally below said conveyor, a movable cam means having cam lobes for raising and lowering said movable means for elevating and arresting movement of certain of said pieces of lumber at intervals.

8. A lumber handling device comprising a conveyor for moving a plurality of pieces of lumber, movable members normally below said conveyor, and means for raising one end only of said members above said conveyor whereby the pieces of lumber on said conveyor and above said members are arrested.

9. A lumber handling device comprising a conveyor for moving a plurality of pieces of lumber, pivotally mounted members normally below said conveyor, and means for raising one end only of said members above said conveyor whereby the pieces of lumber on said conveyor and above said members are arrested.

10. A lumber handling device comprising a conveyor for moving a plurality of pieces of lumber, movable members normally below said conveyor, and means for raising said members into an inclined position relative to said conveyor whereby said pieces of lumber above said members and subsequent pieces of lumber on said conveyor are arrested.

In witness whereof, I hereunto subscribe my name to this specification.

ROBERT Z. DRAKE.